US012062306B2

(12) United States Patent
Okada (10) Patent No.: US 12,062,306 B2
(45) Date of Patent: Aug. 13, 2024

(54) DISPLAY SYSTEM

(71) Applicant: Alps Alpine Co., LTD., Tokyo (JP)

(72) Inventor: Hiroki Okada, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/972,829

(22) Filed: Oct. 25, 2022

(65) Prior Publication Data

US 2023/0134109 A1    May 4, 2023

(30) Foreign Application Priority Data

Nov. 1, 2021  (JP) ................... 2021-178934

(51) Int. Cl.
| G09G 3/00 | (2006.01) |
| G06F 11/07 | (2006.01) |
| G09G 3/20 | (2006.01) |
| G06F 9/455 | (2018.01) |
| G06F 11/14 | (2006.01) |
| G09G 5/14 | (2006.01) |

(52) U.S. Cl.
CPC ........... *G09G 3/006* (2013.01); *G09G 3/20* (2013.01); *G06F 9/45533* (2013.01); *G06F 11/0739* (2013.01); *G06F 11/0757* (2013.01); *G06F 11/0772* (2013.01); *G06F 11/1484* (2013.01); *G09G 5/14* (2013.01); *G09G 2330/12* (2013.01); *G09G 2380/10* (2013.01)

(58) Field of Classification Search
CPC ...... G09G 3/006; G09G 3/20; G09G 2330/12; G09G 2380/10; G09G 5/14; G06F 11/0739; G06F 11/0757; G06F 11/0772; G06F 9/45533; G06F 11/1484
See application file for complete search history.

(56) References Cited

U.S. PATENT DOCUMENTS

| 10,705,377 | B2 | 7/2020 | Nishihara et al. | |
| 2016/0063659 | A1* | 3/2016 | Jangda | G06T 1/20 345/522 |
| 2019/0333471 | A1* | 10/2019 | Carazo | B60K 35/10 |
| 2020/0135153 | A1 | 4/2020 | Ogawa et al. | |
| 2022/0075697 | A1* | 3/2022 | Sugiura | B60K 35/00 |

FOREIGN PATENT DOCUMENTS

| JP | 2007-292812 | 11/2007 |
| WO | WO2020/230549 | 11/2020 |

OTHER PUBLICATIONS

Extended European Search Report issued Mar. 13, 2023 in corresponding European Patent Application No. 22201446.6.

* cited by examiner

*Primary Examiner* — Douglas M Wilson
(74) *Attorney, Agent, or Firm* — Crowell & Moring LLP (57) ABSTRACT

One form of a displaying unit combines a first screen, a second screen, and a third screen generated by a rendering unit so as to be arranged in a horizontal direction, and displays the combined screens on a display unit. A timer counter circuit causes the abnormality monitoring unit to set the black screen layer ON of the screen in which normality of each part related to the screen cannot be detected at a time interval shorter than a predetermined time, and the displaying unit displays the screen in a black screen by superimposing and displaying a black screen layer on the screen in which the black screen layer of being ON has been set.

11 Claims, 6 Drawing Sheets

DISPLAY SYSTEM

BACKGROUND

The present application claims priority to Japanese Patent Application Number 2021-178934, filed Nov. 1, 2021, the entirety of which is hereby incorporated by reference.

BACKGROUND

1. Field of the Disclosure

The present disclosure relates to a display system mounted on an automobile.

2. Description of the Related Art

Forms of a display system that is mounted in an automobile and that displays a plurality of screens on a horizontally long display, side by side, in a horizontal direction is known (for example, JP 2007-292812 A).

SUMMARY

In a display system mounted on an automobile, when an abnormality such as a failure occurs, it is preferable to realize functional safety in which a screen related to the abnormality is displayed in black.

However, in a display system that displays a plurality of screens on one display, when the entire surface of the display screen of the display is set to a black screen display by turning off the backlight of the display or the like, a screen that is not abnormal or a screen that is not a functional safety target is also set to black screen display, which is not preferable.

If a processing unit that performs rendering processing for a screen related to an abnormality is caused to render a black screen as a screen, only the screen related to the abnormality can be made a black screen. However, since the rendering processing for the screen is normally realized by software processing, this is not necessarily sufficient in reliability of functional safety.

Further, in the processing of displaying a screen related to an abnormality in black when an abnormality is detected, when a failure or the like occurs in the processing unit itself that detects the abnormality, the screen related to an abnormality cannot be reliably displayed in black.

Therefore, an objective of the present disclosure is to reliably display only a screen related to an abnormality such as a failure as a black screen when an abnormality occurs in a display system that displays a plurality of screens on one display.

In order to achieve the above objective, the present disclosure provides a display system that displays a plurality of different screens on one display, the display system including a rendering unit configured to render each of the plurality of screens, a display unit configured to arrange the screens drawn by the rendering unit and to display the screens on the display, a black screen display control unit, and an abnormality monitoring unit configured to perform detection for an abnormality related to a target screen for at least one screen as the target screen, and to output normality detection to the black screen display control unit when no abnormality is detected. The black screen display control unit is configured to set, on the display unit, a black screen being ON for a target for which normality detection is no longer being output at a time interval shorter than a predetermined time interval from the abnormality monitoring unit, and the display unit is configured to display a black screen of the target screen for which a black screen being ON is set.

Here, the display system may be configured to cause the black screen display control unit to set a black screen being OFF for a target screen for which the normality detection is being output from the abnormality monitoring unit, and for the target screen on which a black screen being OFF is set, to cause the display unit to display the target screen on the display without displaying the black screen of the target screen.

In addition, in this case, the display system may be configured such that, when the operation of the display system is started, a black screen being ON is set as an initial value on each of the target screens.

In addition, in this case, the display system may be configured such that the black screen display control unit includes a timer counter corresponding to each target screen, where the black screen display control unit is configured to reset each timer counter when normality detection of a corresponding target screen has been output, and when counting has proceeded to a predetermined value, and to set a black screen being OFF for the corresponding target screen on the display unit when the normality detection of the corresponding target screen has been output, and to set a black screen being ON for the corresponding target screen on the display unit when counting has proceeded to the predetermined value, and the abnormality monitoring unit performs detection for an abnormality related to each target screen at a time interval shorter than a time required for the timer counter to count from zero to the predetermined value, and to output normality detection to the black screen display control unit when no abnormality is detected.

In addition, in this case, the display system may further include an abnormal flag corresponding to each target screen, and the abnormality monitoring unit is configured to set the abnormal flag corresponding to a target screen in which no abnormality has been detected to a first value to output the normality detection of the target screen to the black screen display control unit, and the black screen display control unit is configured to execute a task corresponding to each target screen. Here, each task repeatedly performs processing of inquiring a value of the abnormal flag corresponding to the corresponding target screen, setting a black screen being OFF for the corresponding target screen on the display unit when the abnormal flag is the first value, or else setting a second value to the abnormality flag, and setting a black screen being ON for the corresponding target screen on the display unit when the abnormal flag is the second value at predetermined time intervals. In addition, the abnormality monitoring unit is configured to perform detection for an abnormality related to each target screen at a time interval shorter than the predetermined time, and to set an abnormal flag corresponding to a target screen in which no abnormality has been detected to a first value.

Here, the above display system may be configured such that, for the target screens on which the black screen being ON is set, the display unit overlaps a layer of the black screen on the target image and displays the overlapped layers on the display to perform black screen display on the target screen.

Further, in forms of the above display system, the black screen display control unit is preferably operated on an operation base different from that of at least the rendering unit and the abnormality monitoring unit.

Furthermore, the above display system may be an in-vehicle display system mounted on an automobile.

According to forms of such a display system, in a display system that arranges and displays a plurality of screens on a single display, black screen display can be performed for each screen.

In addition, since black screen display is performed not at the time of abnormality detection but when normal cannot be detected at a time interval shorter than a predetermined time, the black screen display is performed even in a case where a failure occurs in the abnormality detection function itself, and reliability of functional safety can be improved.

As described above, according to forms of the present disclosure, when an abnormality such as a failure occurs in a display system that displays a plurality of screens on one display, only a screen related to the abnormality can be reliably displayed in black.

DETAILED DESCRIPTION

Hereinafter, embodiments and implementations of the present disclosure will be described.

First, a first embodiment will be described.

Figure 1:
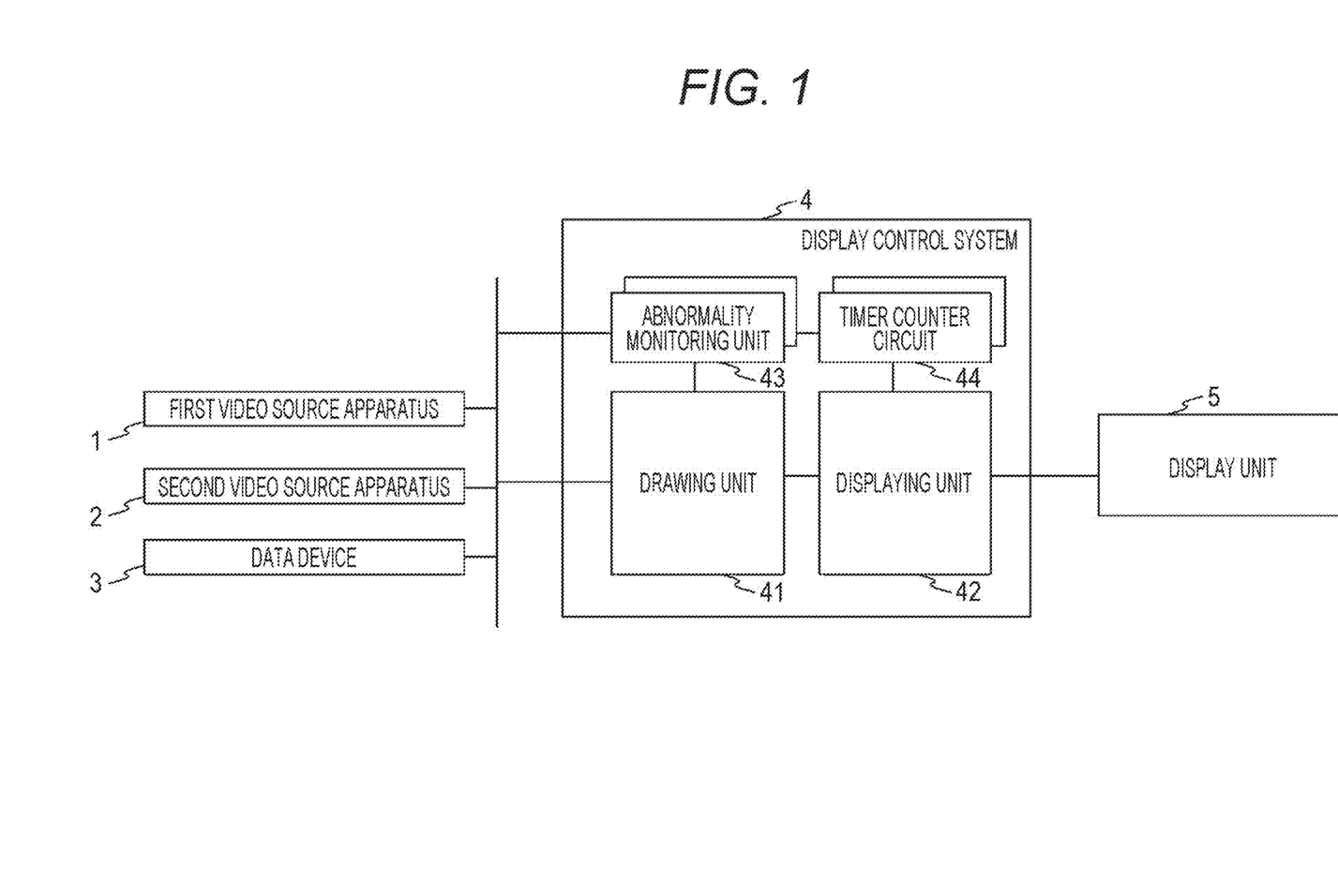
FIG. 1 is a block diagram that illustrates one form of a configuration of a display system according to a first embodiment of the present disclosure.

FIG. 1 illustrates one form of a configuration of a display system according to the first embodiment.

As illustrated, the display system includes a first video source device 1, a second video source device 2, a data device 3, a display control system 4, and a display unit 5.

The display control system 4 is a system configured as, for example, a system on a chip (SoC) including a processor, controller, and or processing circuitry that may be configured to execute instructions stored in a memory to implement a rendering unit 41, a displaying unit 42, an abnormality monitoring unit 43, and a timer counter circuit 44.

Figure 2:
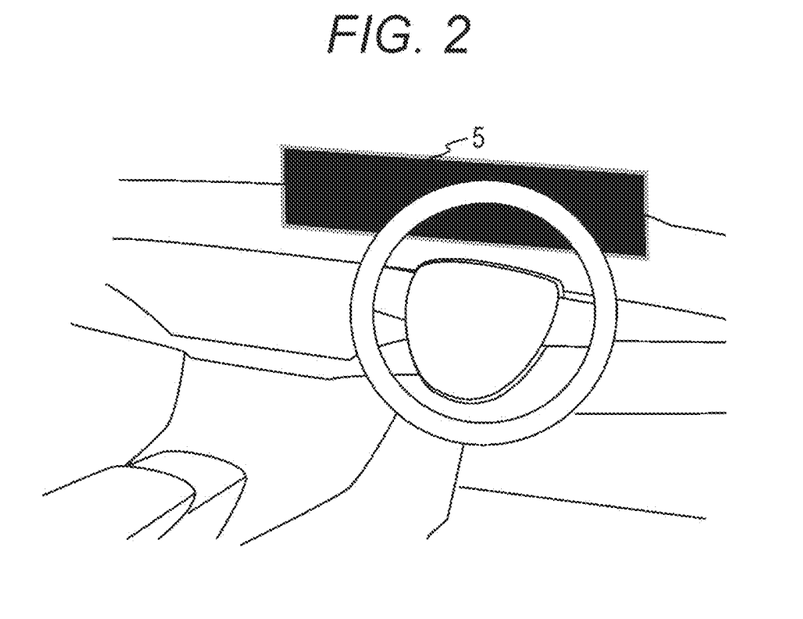
FIG. 2 is a view illustrating an arrangement of one form of a display according to the first embodiment of the present disclosure.

The display unit 5 is a display device having a horizontally long large display surface, and is disposed, for example, on a dashboard of an automobile as illustrated in FIG. 2.

Figure 3:
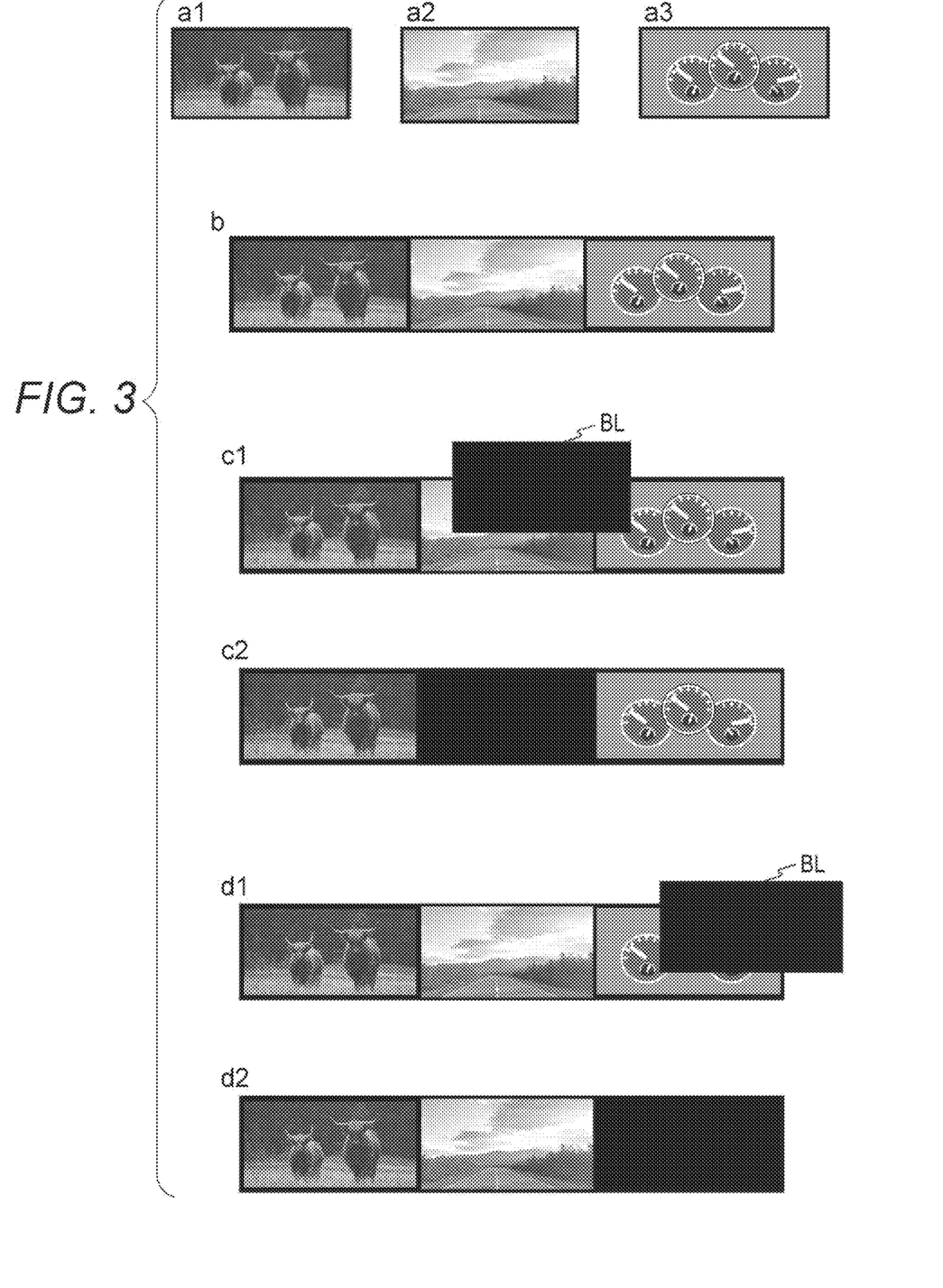
FIG. 3 is a diagram illustrating functions of one form of a rendering unit and a displaying unit according to the first embodiment of the present disclosure.

The first video source device 1 is, for example, a video player or the like, and the rendering unit 41 of the display control system 4 generates, for example, a first screen representing the video output from the first video source device 1 as illustrated in FIG. 3a1.

The second video source device 2 is, for example, a camera that captures an image of the rear side of the automobile, and the rendering unit 41 of the display control system 4 generates, for example, a second screen representing the video output from the second video source device 2 as illustrated in FIG. 3a2.

The data device 3 outputs, for example, data representing various states such as a vehicle speed of an automobile and a rotation speed of an engine to the display control system 4, and the rendering unit 41 of the display control system 4 generates, for example, a third screen imitating a meter cluster as illustrated in FIG. 3a3 from the data output from the data device 1.

Then, as illustrated in FIG. 3b, the displaying unit 42 of the display control system 4 combines the first screen, the second screen, and the third screen generated by the rendering unit so as to be aligned in the horizontal direction, and displays the combined screens on the display unit 5.

Here, the second screen and the third screen are screens of a functional safety target for performing black screen display when an abnormality such as a failure related to the screen occurs.

Next, as illustrated in FIG. 3d1, the displaying unit 42 has a function of displaying the layer BL of the black screen in an overlapping manner on the second screen generated by the rendering unit 41, and by displaying the layer BL of the black screen in an overlapping manner, the second screen is displayed as the black screen as illustrated in FIG. 3c2.

Similarly, as illustrated in FIG. 3d1, the displaying unit 42 has a function of displaying the layer BL of the black screen on the third screen generated by the rendering unit 41 in an overlapping manner independently of a function of displaying the layer BL of the black screen on the second screen in an overlapping manner, and the third screen is displayed in the black screen as illustrated in FIG. 3d2 by displaying the layer BL of the black screen in an overlapping manner.

Next, the display control system 4 includes the timer counter circuit 44 corresponding to the second screen and the timer counter circuit 44 corresponding to the third screen.

The abnormality monitoring unit 43 performs detection for abnormality/normality of the second video source device 2 and the rendering unit 41 related to the second screen, and in a case where the normality is detected, notifies the timer counter circuit 44 corresponding to the second screen of the normality detection.

In addition, the abnormality monitoring unit 43 performs detection for the abnormality/normality of the data device 3 and the rendering unit 41 related to the third screen, and in a case where the normality is detected, notifies the timer counter circuit 44 corresponding to the third screen of the normality detection.

An operation of the black screen control in such a display system will be described below.

When the black screen layer ON of the second screen is set in the displaying unit 42 and the black screen layer ON of the second screen is set in the default state at the time of activation of the display system, the displaying unit 42 overlaps the black screen layer BL on the second screen and displays the same on the display unit 5. In addition, when the black screen layer OFF of the second screen is set, the displaying unit 42 displays the second screen generated by the rendering unit on the display unit 5 as it is.

In addition, similarly, when the black screen layer ON of the third screen is set in the displaying unit 42 and the black screen layer ON of the third screen is set in the default state at the time of activation of the display system, the displaying unit 42 overlaps the black screen layer BL on the third screen and displays the same on the display unit 5. In addition, when the black screen layer OFF of the third screen is set, the displaying unit 42 displays the third screen generated by the rendering unit on the display unit 5 as it is.

Next, the operation of each timer counter circuit 44 will be described.

The timer counter circuit 44 is a counter that counts up a count value TCNT by a clock of a constant cycle, and the count value TCNT is reset when the abnormality monitoring unit 43 notifies normality detection and when the count value TCNT reaches the value Th.

In addition, the timer counter circuit 44 sets the black screen layer OFF of the corresponding screen in the displaying unit 42 when being reset by the notification of the normality detection before the count value TCNT reaches a value Th. Further, when the count value TCNT reaches the value Th and is reset, the timer counter circuit 44 sets the displaying unit 42 to turn on the black screen layer of the corresponding screen.

Here, the abnormality monitoring unit 43 is configured to repeatedly detect abnormality/normality related to the corresponding screen at a time interval shorter than the time required for the timer counter circuit 44 to count the count value TCNT from 0 to the value Th.

Figure 4:
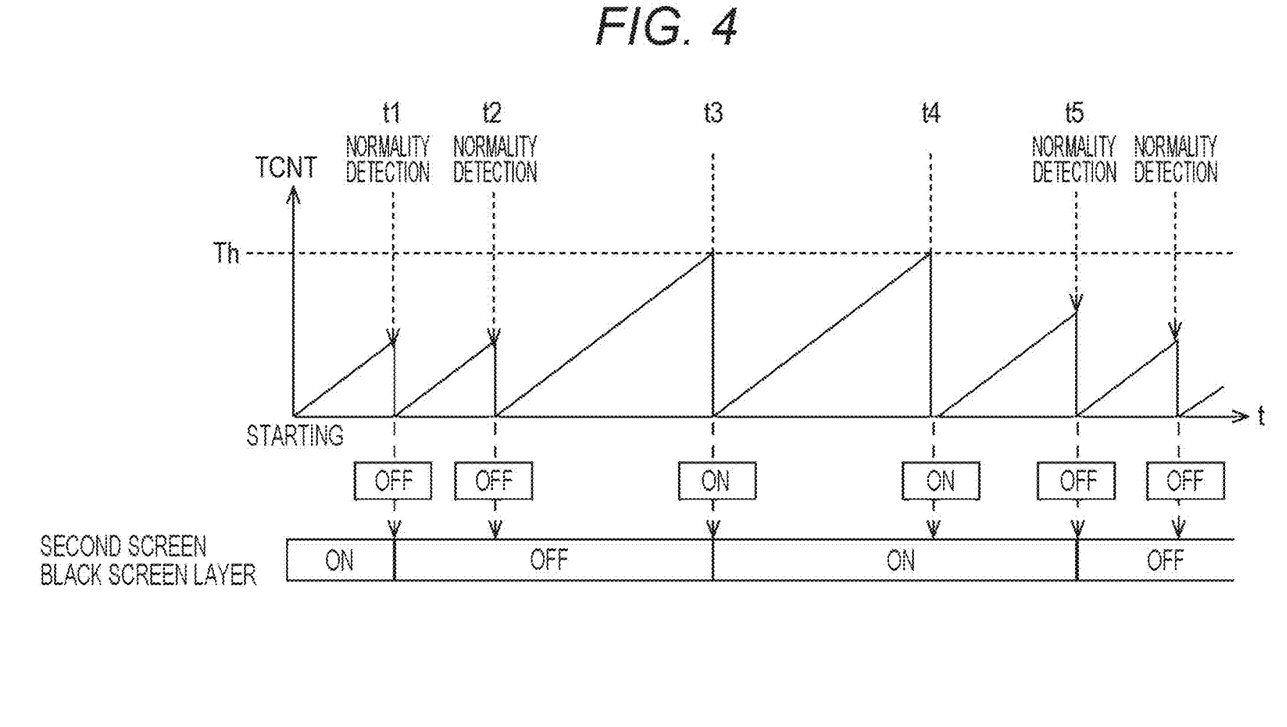
FIG. 4 is a diagram illustrating one form of a control operation of black screen display according to the first embodiment of the present disclosure.

Since the procedure of controlling the black screen display on the second screen and the third screen, which are the screens of the functional safety target, is the same, a specific example of the above operation of the timer counter circuit 44 is illustrated in FIG. 4 with the second screen as a representative example.

As illustrated in FIG. 4, the second screen turns on the black screen layer by default at the time of activation to display a black screen, and counting-up of the count value TCNT of the timer counter circuit 44 corresponding to the second screen is started.

Then, when the abnormality monitoring unit 43 notifies normality detection at time t1 before the count value TCNT of the timer counter circuit 44 corresponding to the second screen reaches the value Th, the count value TCNT of the timer counter circuit 44 corresponding to the second screen is reset to zero (0), the black screen layer OFF of the second screen is set, the black screen display is released, and the second screen generated by the rendering unit 41 is displayed on the display unit 5.

Then, when the timer counter circuit 44 corresponding to the second screen starts counting up the count value TCNT from zero (0) and the abnormality monitoring unit 43 notifies normality detection at time t2 before the count value TCNT reaches the value Th, the count value TCNT of the timer counter circuit 44 corresponding to the second screen is reset to zero (0), the black screen layer being OFF for the second screen is set, and the display of the second screen generated by the rendering unit 41 on the display unit 5 is maintained.

Then, when the timer counter circuit 44 corresponding to the second screen starts counting up the count value TCNT from zero (0) and the count value TCNT reaches the value Th without receiving the notification of the normality detection from the abnormality monitoring unit 43 at time t3, the count value TCNT of the timer counter circuit 44 is reset to zero (0), the black screen layer of the second screen is set to ON, and the second screen is displayed in black screen.

Then, the timer counter circuit 44 corresponding to the second screen starts counting up the count value TCNT from zero (0), and when the count value TCNT reaches the value Th again at time t4 without receiving the notification of the normality detection from the abnormality monitoring unit 43, the count value TCNT of the timer counter circuit 44 is reset to zero (0), the black screen layer ON of the second screen is set, and the black screen display of the second screen is maintained.

Then, when the timer counter circuit 44 corresponding to the second screen starts counting up the count value TCNT from zero (0) and the abnormality monitoring unit 43 notifies normality detection at time t5 before the count value TCNT of the timer counter circuit 44 corresponding to the second screen reaches the value Th, the count value TCNT of the timer counter circuit 44 corresponding to the second screen is reset to zero (0), the black screen layer OFF of the second screen is set, the black screen display is released, and the second screen generated by the rendering unit 41 is displayed on the display unit 5.

As a result, after the display system is started, the black screen display of the second screen is maintained until normality of each unit related to the second screen is detected by the abnormality monitoring unit 43, and after the normality is detected, the display of the second screen generated by the rendering unit 41 on the display unit 5 is started. Thereafter, while the abnormality monitoring unit 43 detects normality of each unit related to the second screen at a time interval shorter than a predetermined time required for the timer counter circuit 44 to count up from zero (0) to the count value TCNT, the display of the second screen generated by the rendering unit 41 on the display unit 5 is continued, and when the abnormality monitoring unit 43 cannot detect normality of each unit related to the second screen at a time interval shorter than a predetermined time, the display of the second screen transitions to black screen display, and the black screen display is maintained until normality of each unit related to the second screen is detected by the abnormality monitoring unit 43.

The first embodiment of the disclosure has been described as above.

As described above, according to the first embodiment, in the display system that displays a plurality of screens side by side on a single display unit 5, the black screen display can be performed for each screen.

In addition, since black screen display is performed not at the time of abnormality detection but when normal cannot be detected at a time interval shorter than a predetermined time, the black screen display is performed even in a case where a failure occurs in the abnormality detection function itself, and reliability of functional safety can be improved.

In addition, the timer counter circuit 44 can be mounted on the display control system 4 as independently operable hardware, and by doing so, more reliable functional safety can be realized.

Hereinafter, a second embodiment of the present disclosure will be described.

Figure 5:
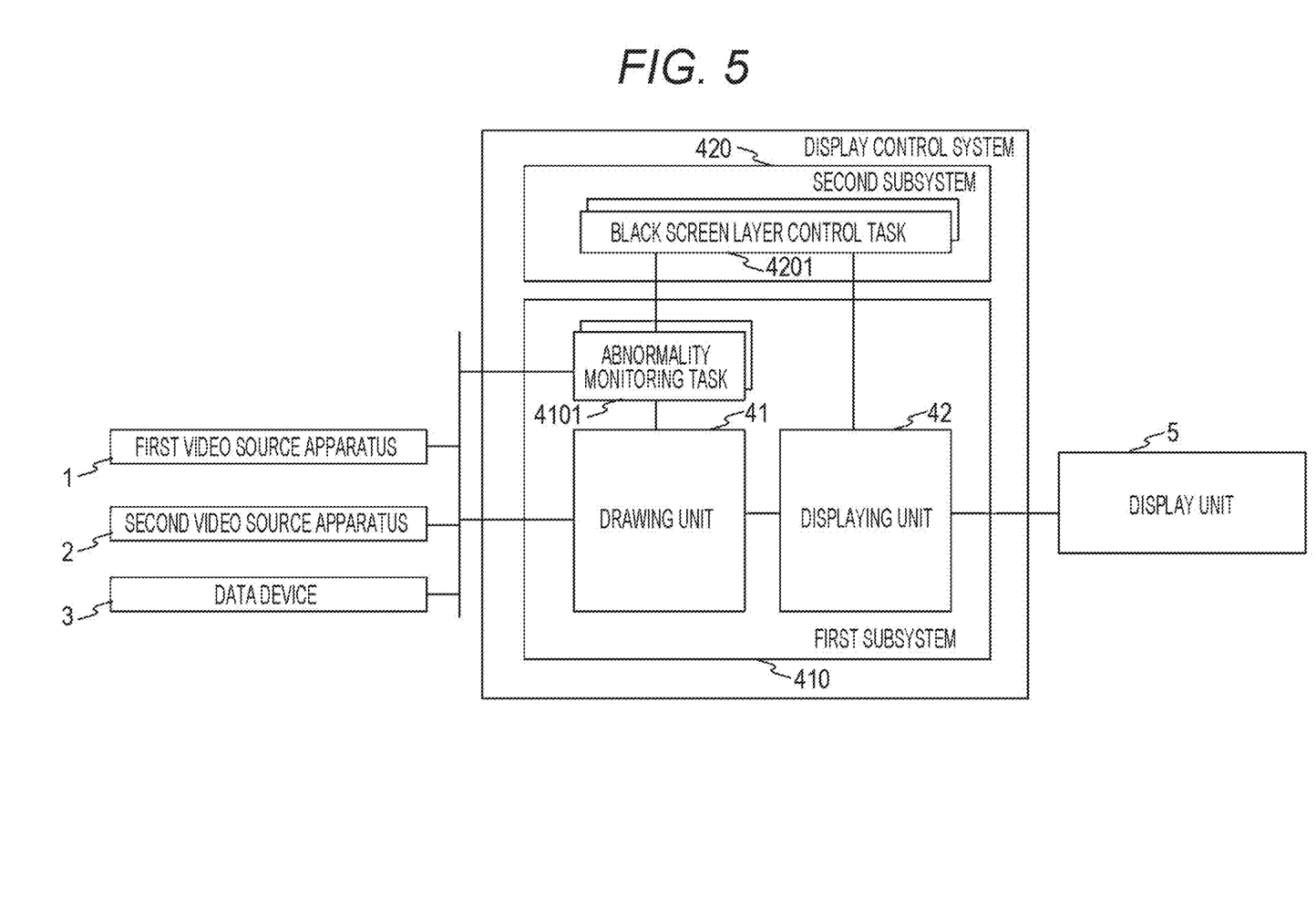
FIG. 5 is a block diagram that illustrates one form of a configuration of a display system according to a second embodiment of the present disclosure.

FIG. 5 illustrates one form of a configuration of a display system according to the second embodiment.

Forms of a display system according to the second embodiment is different from forms of a display system according to the first embodiment illustrated in FIG. 1 only in the configuration of the display control system.

As illustrated, the display system 4 according to the second embodiment includes a first subsystem 410 and a second subsystem 420.

The first subsystem 410 and the second subsystem 420 are systems built on different virtual machines on a hypervisor or on different CPUs.

The first subsystem 410 includes the rendering unit 41 and the displaying unit 42 described in the first embodiment. The first subsystem 410 executes an abnormality monitoring task 4101 corresponding to the second screen and an abnormality monitoring task 4101 corresponding to the third screen.

Then, similarly to the first embodiment, assuming that the second screen and the third screen are functional safety target screens, the second subsystem 421 executes a black screen layer control task 4201 corresponding to the second screen and the black screen layer control task 4201 corresponding to the third screen.

Figure 6:
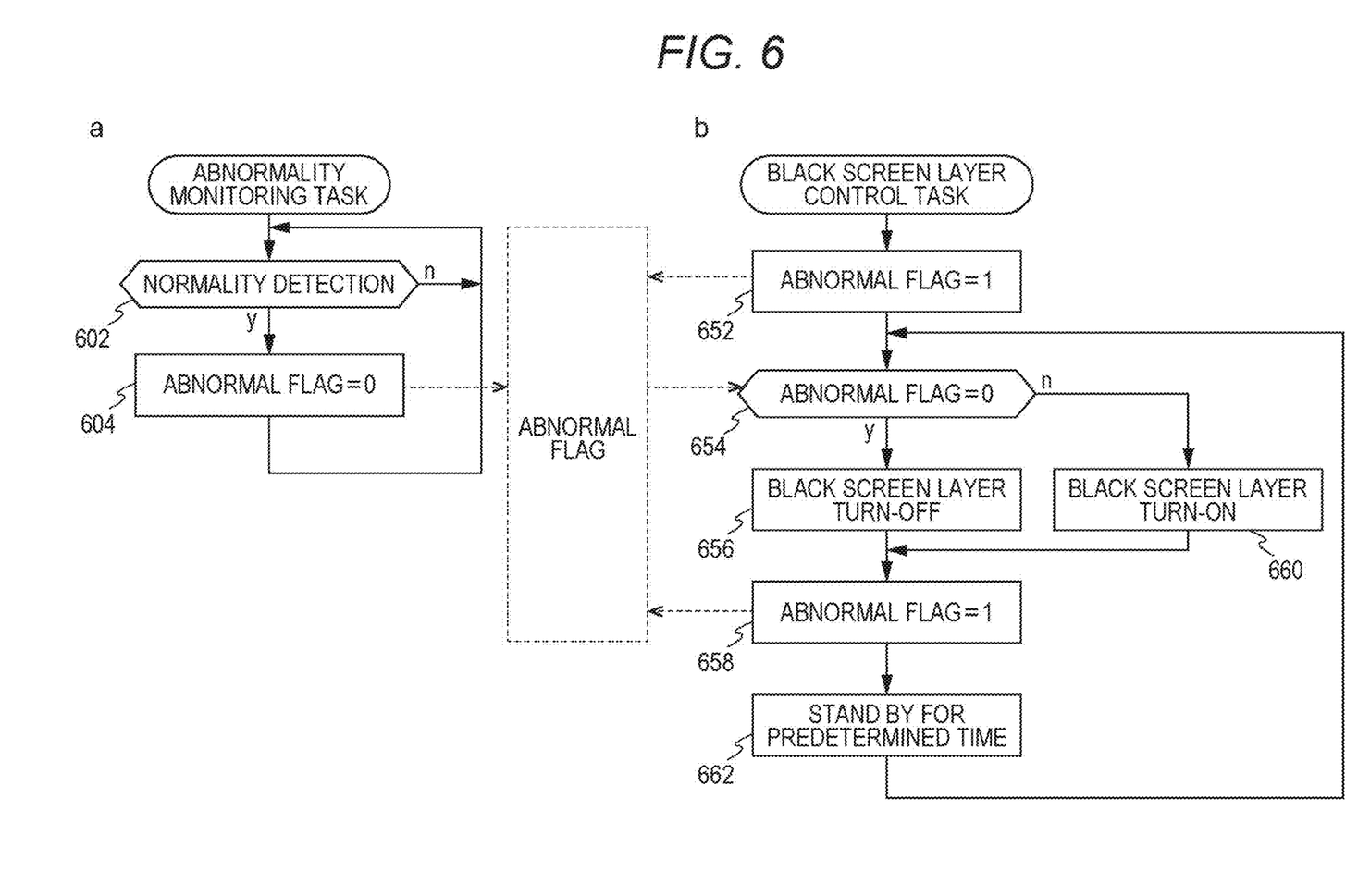
FIG. 6 is a diagram illustrating one form of a control operation of black screen display according to the second embodiment of the present disclosure.

Since the procedure of controlling black screen display on the second screen and the third screen, which are screens targeted for functional safety, is the same, the operation of black screen display will be described below with the second screen as a representative example.

As illustrated in FIG. 6a, during the operation of the display system, the abnormality monitoring task 4101 corresponding to the second screen performs detection for the abnormality/normality of the second video source device 2 and the rendering unit 41 related to the second screen (step 602), and repeatedly performs processing of setting the abnormal flag to 0 (step 604) when the normality is detected.

As illustrated in FIG. 6b, when the display system is activated, the black screen layer control task 4201 corresponding to the second screen sets the abnormal flag to 1 (step 652). Then, it is checked whether the abnormal flag is zero (0) (step 654).

Then, if the abnormal flag is zero (0), the black screen layer OFF of the second screen is set (step 656), and the abnormal flag is set to 1 (step 658). If the abnormal flag is not zero (0) but 1, the black screen layer ON of the second screen is set (step 660), and the abnormal flag is set to 1 (step 658).

Then, when the abnormal flag is set to 1 in step 658, the processing waits for the elapse of a predetermined time (for example, 15 ms) (step 662), and returns to the processing from step 654.

Here, the abnormality monitoring task 4101 is configured to repeatedly perform detection of abnormality/normality related to the corresponding screen at a time interval shorter than a predetermined time for waiting for elapse in step 662 of the black screen layer control task 4201.

According to the operation of the black screen layer control task 4201, the black screen display of the second screen is controlled as follows.

That is, when the second screen is activated, the black screen display is turned on by default and the black screen is displayed. In addition, since the abnormal flag is set to 1 by the black screen layer control task 4201 at the time of activation (step 652), the black screen layer ON is continuously set (step 660) and the black screen display of the second screen is maintained until normality of each unit related to the second screen is detected by the abnormality monitoring task 4101 and the abnormal flag is set to zero (0).

On the other hand, when normality of each unit related to the second screen is detected by the abnormality monitoring task 4101 and the abnormal flag is set to zero (0) (step 654), the black screen layer OFF is set (step 656), the black screen display is released, and the second screen generated by the rendering unit 41 is displayed on the display unit 5.

After the black screen layer OFF is set (step 658), the abnormal flag is set again to 1 (step 658), and after a predetermined time elapses (step 662), the black screen layer OFF setting (step 656) and the black screen layer ON setting (step 660) according to the value of the abnormal flag are performed again.

Therefore, when normality of each unit related to the second screen is detected by the abnormality monitoring task 4101 and the abnormal flag is not set to zero (0) during the lapse of the predetermined time (step 662), the black screen layer ON is set (step 660) and the black screen display of the second screen is performed.

On the other hand, when normality of each unit related to the second screen is detected by the abnormality monitoring task 4101 and the abnormal flag is set to zero (0) during the lapse of the predetermined time (step 662), the black screen layer OFF is set (step 656), and the display of the second screen generated by the rendering unit 41 on the display unit 5 is maintained.

As a result, after the display system is started, the black screen display of the second screen is maintained until normality of each unit related to the second screen is detected by the abnormality monitoring task 4101, and after the normality is detected, the display of the second screen generated by the rendering unit 41 on the display unit 5 is started. Thereafter, while the normality of each unit related to the second screen is detected at a time interval shorter than the predetermined time by the abnormality monitoring task 4101, the display of the second screen generated by the rendering unit 41 on the display unit 5 continues, and when the normality of each unit related to the second screen cannot be detected at a time interval shorter than the predetermined time by the abnormality monitoring task 4101, the display of the second screen transitions to black screen display, and is maintained until the normality of each unit related to the second screen is detected by the abnormality monitoring task 4101.

As described above, according to the second embodiment, in the display system that displays the screens of the number of single display unit side by side, the black screen display can be performed for each screen.

In addition, since black screen display is performed not at the time of abnormality detection but when normal cannot be detected at a time interval shorter than a predetermined time, the black screen display is performed even in a case where a failure occurs in the abnormality detection function itself, and reliability of functional safety can be improved. In addition, since the abnormality monitoring task 4101 for detecting an abnormality and the black screen layer control task 4201 for controlling black screen display are mounted on different virtual machines on the hypervisor or different subsystems constructed on different CPUs, more reliable functional safety can be realized.

Embodiments of the present disclosure has been described.

In forms of the above embodiments, the black screen display of the screen is performed by overlapping and displaying the black screen display on the screen in the displaying unit 42, but the black screen display of the screen may be performed by another method. For example, in the displaying unit 42, the black screen display of the screen may be performed by masking pixel data representing a color such as RGB of pixels constituting the screen output from the rendering unit 41 and outputting black pixel data.

Forms of the above embodiments can also be similarly applied to a case where the display control system 4 performs display on a plurality of display units 5.

Although embodiments and implementations of the present disclosure have been described in detail above, the present disclosure is not limited to the specific embodiments, and various modifications and changes can be made within the scope of the disclosure set forth in the claims. Therefor, it is intended that this disclosure not be limited to the particular embodiments disclosed, but that the disclosure will include all embodiments and implementations falling within the scope of the appended claims.

The invention claimed is:

1. A display system that displays a plurality of different screens on one display, the display system comprising:
a rendering unit configured to render each of the plurality of screens;
a display unit configured to arrange a screen of the plurality of screens drawn by the rendering unit and to display the screen of the plurality of screens on the display;
a black screen display control unit; and
an abnormality monitoring unit configured to repeatedly detect an abnormality related to at least one screen of the plurality of screens as a target screen, for each screen of the plurality of screens that is a target screen, and to output normality detection to the black screen display control unit when no abnormality is detected;
wherein the black screen display control unit is configured to set, on the display unit, a black screen being ON of a target for which normality detection is no longer output at a time interval shorter than a predetermined time from an abnormality monitoring unit;
wherein the display unit is configured to perform black screen display of a target screen on which a black screen being ON is set;
wherein the black screen display control unit is configured to set, on the display unit, a black screen being OFF of the target screen on which normality detection is output from the abnormality monitoring unit;
wherein the display unit is configured to display the target screen set with the black screen OFF on the display without displaying a black screen of the target screen; and
wherein when the operation of the display system is started, a black screen being ON is set as an initial value on each of the target screens.

2. The display system according to claim 1, wherein:
the black screen display control unit includes a timer counter corresponding to each target screen,
the black screen display control unit is configured to reset each timer counter when normality detection of a corresponding target screen is output and when counting proceeds to a predetermined value, to set a black screen being OFF for the corresponding target screen on the display unit when the normality detection of the corresponding target screen is output, and to set a black screen being ON for the corresponding target screen on the display unit when the counting proceeds to the predetermined value, and
the abnormality monitoring unit is configured to perform detection for an abnormality related to each target screen at a time interval shorter than a time required for the timer counter to count from 0 to the predetermined value, and to output normality detection to the black screen display control unit when no abnormality is detected.

3. The display system according to claim 1, wherein:
each target screen is associated with an abnormality flag;
the abnormality monitoring unit is configured to set the abnormal flag corresponding to a target screen in which no abnormality has been detected to a first value to output the normality detection of the target screen to the black screen display control unit;
the black screen display control unit is configured to execute a task corresponding to each target screen;
each task repeatedly performs processing of inquiring a value of the abnormal flag corresponding to the corresponding target screen, setting a black screen being OFF for the corresponding target screen on the display unit and setting a second value to the abnormal flag when the abnormal flag is a first value, and setting a black screen being ON for the corresponding target screen on the display unit when the abnormal flag is the second value at predetermined time intervals, and
the abnormality monitoring unit is configured to perform detection for an abnormality related to each target screen at a time interval shorter than the predetermined time, and to set an abnormal flag corresponding to a target screen in which no abnormality has been detected to a first value.

4. The display system according to claim 3, wherein:
for the target screen on which the black screen being ON is set, the display unit is configured to overlap layers of the black screen on the target image and to display the overlapped layers on the display to perform black screen displaying of the target screen.

5. The display system according to claim 4, wherein:
the black screen display control unit is configured to operate on an operation base different from that of at least the rendering unit and the abnormality monitoring unit.

6. The display system according to claim 5, wherein:
the display system is an in-vehicle display system mounted on an automobile.

7. A display system that displays a plurality of different screens on one display, the display system comprising:
a rendering unit configured to render each of the plurality of screens;
a display unit configured to arrange a screen of the plurality of screens drawn by the rendering unit and to display the screen of the plurality of screens on the display;
a black screen display control unit; and
an abnormality monitoring unit configured to repeatedly detect an abnormality related to at least one screen of the plurality of screens as a target screen, for each screen of the plurality of screens that is a target screen, and to output normality detection to the black screen display control unit when no abnormality is detected;
wherein the black screen display control unit is configured to set, on the display unit, a black screen being ON of a target for which normality detection is no longer output at a time interval shorter than a predetermined time from an abnormality monitoring unit;
wherein the display unit is configured to perform black screen display of a target screen on which a black screen being ON is set; wherein
the black screen display control unit is configured to set, on the display unit, a black screen being OFF of the target screen on which normality detection is output from the abnormality monitoring unit; wherein
the display unit is configured to display the target screen set with the black screen OFF on the display without displaying a black screen of the target screen;
wherein the black screen display control unit includes a timer counter corresponding to each target screen; wherein
the black screen display control unit is configured to reset each timer counter when normality detection of a corresponding target screen is output and when counting proceeds to a predetermined value, to set a black screen being OFF for the corresponding target screen on the display unit when the normality detection of the corresponding target screen is output, and to set a black screen being ON for the corresponding target screen on the display unit when the counting proceeds to the predetermined value; and wherein the abnormality monitoring unit is configured to perform detection for an abnormality related to each target screen at a time interval shorter than a time required for the timer counter to count from zero to the predetermined value, and to output normality detection to the black screen display control unit when no abnormality is detected.

8. A display system that displays a plurality of different screens on one display, the display system comprising:

a rendering unit configured to render each of the plurality of screens;

a display unit configured to arrange a screen of the plurality of screens drawn by the rendering unit and to display the screen of the plurality of screens on the display;

a black screen display control unit; and an abnormality monitoring unit configured to repeatedly detect an abnormality related to at least one screen of the plurality of screens as a target screen, for each screen of the plurality of screens that is a target screen, and to output normality detection to the black screen display control unit when no abnormality is detected;

wherein the black screen display control unit is configured to set, on the display unit, a black screen being ON of a target for which normality detection is no longer output at a time interval shorter than a predetermined time from an abnormality monitoring unit, and wherein the display unit is configured to perform black screen display of a target screen on which a black screen being ON is set;

wherein the black screen display control unit is configured to set, on the display unit, a black screen being OFF of the target screen on which normality detection is output from the abnormality monitoring unit;

wherein the display unit is configured to display the target screen set with the black screen OFF on the display without displaying a black screen of the target screen;

wherein each target screen is associated with an abnormality flag;

wherein the abnormality monitoring unit is configured to set the abnormal flag corresponding to a target screen in which no abnormality has been detected to a first value to output the normality detection of the target screen to the black screen display control unit, wherein the black screen display control unit is configured to execute a task corresponding to each target screen, wherein each task repeatedly performs processing of inquiring a value of the abnormal flag corresponding to the corresponding target screen, setting a black screen being OFF for the corresponding target screen on the display unit and setting a second value to the abnormal flag when the abnormal flag is a first value, and setting a black screen being ON for the corresponding target screen on the display unit when the abnormal flag is the second value at predetermined time intervals, and wherein the abnormality monitoring unit is configured to perform detection for an abnormality related to each target screen at a time interval shorter than the predetermined time, and to set an abnormal flag corresponding to a target screen in which no abnormality has been detected to a first value.

9. The display system according to claim 8, wherein:

for the target screen on which the black screen being ON is set, the display unit is configured to overlap layers of the black screen on the target image and to display the overlapped layers on the display to perform black screen displaying of the target screen.

10. The display system according to claim 9, wherein:

the black screen display control unit is configured to operate on an operation base different from that of at least the rendering unit and the abnormality monitoring unit.

11. The display system according to claim 10, wherein:

the display system is an in-vehicle display system mounted on an automobile.

* * * * *